3,061,641
ANILINOALKYL-UREAS
William B. Wright, Jr., Woodcliff Lake, N.J., and Herbert J. Brabander, Pearl River, N.Y., assignors to American Cyanamid Company, New York, N.Y., a corporation of Maine
No Drawing. Filed May 4, 1960, Ser. No. 26,683
9 Claims. (Cl. 260—553)

This invention relates to new organic compounds. More particularly, it relates to N substituted phenylamino alkylene ureas.

The novel compounds of the present invention can be illustrated by the following formula:

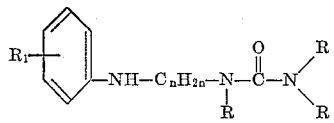

in which R is hydrogen or a lower alkyl radical, $R_1$ is halogen, lower alkoxy or the trifluoromethyl radical and $n$ is an integer from 2 to 3.

The compounds of the present invention are, in general, crystalline solids, a few being liquids at room temperature. They are organic amines and as such are relatively insoluble in water and soluble in lower alkyl alkanols, lower alkyl esters, acetone, chloroform and the like.

The present compounds are active central nerve system depressants. This property makes them valuable as tranquilizers and muscle relaxants.

The compounds of the present invention can be prepared by several methods. One method found highly desirable in producing the compounds of the present invention involves the reaction of an aryldiamine with an alkali metal cyanate which can be illustrated as follows:

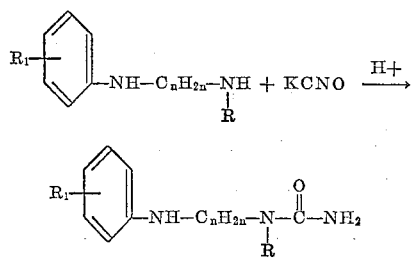

in which R, $R_1$ and $n$ are as described hereinbefore.

A further method of preparing the present compounds involves the reaction of an aryldiamine with a dialkylcarbamoyl halide. This reaction can be illustrated as follows:

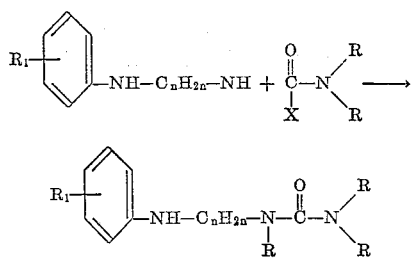

wherein R, $R_1$ and $n$ are as described above and X is a halogen atom. The reactions set forth above are usually carried out by contacting the reagents in solution in a solvent inert to the reactants. The reaction is completed within a period of from 15 minutes to about 48 hours. In carrying out the reaction, the temperatures may vary from about 0° to about 150° C., depending upon the solvent and time of reaction.

The general methods for preparing the ethylene diamine starting materials in the reactions outlined above are generally described in the literature, for example, such as Goldenring, Ber. 23 1169 (1890); Gabriel, Ber. 22 2224 (1889); Fourneau, Bull. Soc. Chim. 7 603 (1940); 11 141 (1944) and in British Patent 729,332.

A still further method which is useful in preparing the compounds of the present invention is a reaction wherein an N,N-dialkyl-N'-(haloalkyl) urea is reacted with a substituted aniline. This reaction can be illustrated by the following equation:

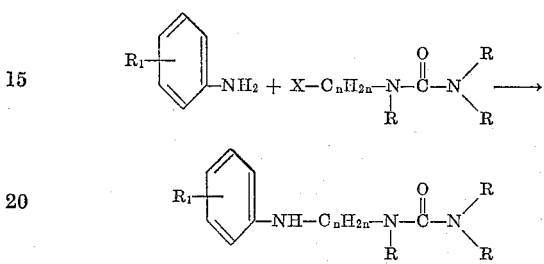

wherein R, $R_1$ and $n$ are as hereinbefore defined and X is a halogen atom. The time and temperature for carrying out this reaction is similar to that hereinbefore set forth for the previously described methods of preparing the present compounds. The desired reaction products can be recovered from the reaction mixture and purified by methods well known in the chemical art.

The substituted anilines used in the above reaction are well known and the method for preparing haloalkyl ureas also used as starting material are described in references, for example, such as Gabriel, Ber. 50 823 (1917) and McKay, J. Org. Chem. 16 1846 (1951).

The products of the present invention as tranquilizers or muscle relaxants can be incorporated in various pharmaceutical forms, such as, tables, capsules, pills and the like. For immediate or sustained use, they may be combined with suitable carriers. They may be in dosage forms for a single therapeutic dosage or in small dosage for multiple doses. Obviously, in addition to the therapeutic component, there may be present excipients, binders, fillers and other therapeutically inert ingredients necessary in the formulation of the desired pharmaceutical preparation.

The folowing examples illustrate the preparation of representative substituted ureas of the present invention. Parts are by weight unless otherwise indicated.

EXAMPLE I

Preparation of 1-[2-(p-Chloroanilino)Ethyl]-1-Methylurea

A mixture of 2.9 parts of N-p-chlorophenyl-N'-methylethylenediamine dihydrobromide, 18 parts of water, 8.4 parts of 1 N sodium hydroxide, and 0.67 part of potassium cyanate is stirred at room temperature for three hours and then heated at refluxing temperatures for four hours. The reaction mixture is shaken with chloroform and the layers are separated. The chloroform layer is dried over magnesium sulfate and then concentrated to a crystalline residue. Recrystallization from ethyl acetate results in a 58% yield of the above compound, melting point 125–127° C.

EXAMPLE II

Preparation of 1-[2-(m-Chloroanilino)Ethyl]-1-Methylurea

The above compound, melting point 124–125° C., is obtained in 56% yield when N-m-chlorophenyl-N'-methylethylenediamine dihydrobromide is substituted for N-p-chlorophenyl-N'-methylethylenediamine dihydrobromide in the process of Example I.

EXAMPLE III

*Preparation of 1-[2-(p-Chloroanilino)Ethyl]-1,3,3-Trimethylurea*

A mixture of 4.5 parts of N-p-chlorophenyl-N'-methylethylenediamine dihydrobromide, 8 parts by volume of 5 N sodium hydroxide, 10 parts of water and 20 parts of ether is cooled to 0–10° C. and stirred rapidly. A solution of 1.2 parts of dimethylcarbamyl chloride in 10 parts of ether is added over a ten minute period. The reaction mixture is stirred without cooling for one hour longer. The ether layer is separated and the aqueous layer is extracted with ether. The combined ether layers are extracted with 4 parts of 1 N hydrochloric acid and then with 5 parts of salt water. The ether layer is dried over magnesium sulfate and then concentrated to recover the 1-[2-(p-chloroanilino)ethyl]-1,3,3-trimethylurea, melting point 63–64° C.

EXAMPLE IV

Following the procedure of Example I and using in place of N-p-chlorophenyl-N'-methylethylenediamine dihydrobromide, the following intermediates N-m-bromophenyl-N'-methylethylenediamine dihydrobromide; N-p-bromophenyl-N'-mthylethylenediamine dihydrobromide; and N-p-methoxyphenyl-N'-methylethylenediamine hydrochloride the following compounds are obtained respectively: 1-[2-(m-bromoanilino)ethyl]-1-methylurea, melting point 126–127° C., 1-[2-(p-bromoanilino)ethyl]-1-methylurea, melting point 122–124° C., 1-[2-(p-methoxyanilino)ethyl]-1-methylurea, melting point 157–158° C.

EXAMPLE V

Using the procedure outlined in Example III and using in place of the starting material N-p-chlorophenyl-N'-methylethylenediamine dihydrobromide, the following intermediates N - m-chlorophenyl - N'-methylethylenediamine dihydrobromide, N - m-bromophenyl - N'-methylethylenediamine dihydrobromide, N-p-bromophenyl-N'-methylethylenediamine dihydrobromide and N-p-methoxyphenyl-N'-methylethylenediamine hydrochloride the following compounds are obtained respectively: 1-[2-(m-chloroanilino)ethyl]-1,3,3-trimethylurea, boiling point 158–162° C./0.1 mm.; 1-[2-(m-bromoanilino)ethyl]-1,3,3-trimethylurea, boiling point 165–167° C./0.07 mm.; 1-[2-(p-bromoanilino)ethyl]-1,3,3-trimethylurea, melting point 75–76° C.; 1-[2-(p-methoxyanilino)ethyl]-1,3,3-trimethylurea, boiling point 160–165° C./0.08 mm.

EXAMPLE VI

*Preparation of 1-[2-(p-Trifluoromethylanilino)Ethyl]-3,3-Dimethylurea*

A mixture of 2.7 parts of N-(p-trifluoromethylphenyl)-ethylenediamine, 3 parts by volume of 5 N sodium hydroxide, 10 parts of water and 20 parts of ether is cooled to 0–10° C. and stirred rapidly. A solution of 1.2 parts of dimethylcarbamyl chloride in 10 parts of ether is added over a ten minute period. The reaction mixture is stirred without cooling for one hour longer. The ether layer is separated and the aqueous layer is extracted with ether. The combined ether layers are extracted with 4 parts of 1 N hydrochloric acid and then with 5 parts of salt water. The ether layer is dried over magnesium sulfate and then concentrated to recover the 1-[2-(p-trifluoromethylanilino)ethyl]-3,3-dimethylurea.

EXAMPLE VII

*Preparation of 1[2-(p-Chloroanilino)Propyl]-3,3-Diethyl-1-Methylurea*

A mixture of 2.6 parts of $N^2$-p-chlorophenyl-$N^1$-methyl-1,2-propanediamine, 3 parts by volume of 5 N sodium hydroxide, 10 parts of water and 20 parts of ether is cooled to 0–10° C. and stirred rapidly. A solution of 1.5 parts of diethylcarbamylchloride in 10 parts of ether is added over a ten minute period. The reaction mixture is stirred without cooling for one hour longer. The ether layer is separated and the aqueous layer is extracted with ether. The combined ether layers are extracted with 4 parts of 1 N hydrochloric acid and then with 5 parts of salt water. The ether layer is dried over magnesium sulfate and then concentrated to recover the 1-[2-(p-chloroanilino)propyl]-3,3-diethyl-1-methylurea.

We claim:

1. A compound having the formula:

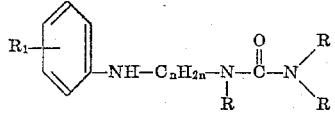

wherein R is a member of the group consisting of hydrogen and lower alkyl, $R_1$ is a member of the group consisting of halogen, lower alkoxy and trifluoromethyl and $n$ is an integer from 2 to 3.

2. A compound in accordance with claim 1 in which R is methyl, $R_1$ is halogen and $n$ is 2.

3. The compound 1 - [2-(p - chloroanilino)ethyl]-1-methylurea.

4. The compound 1 - [2-(m - chloroanilio)ethyl]-1-methylurea.

5. The compound 1 - [2-(m - bromoanilino)ethyl]-1-methylurea.

6. The compound 1 - [2-(p - bromoanilio)ethyl]-1-methylurea.

7. The compound 1-[2-(p-methoxyanilino)ethyl]-1-methylurea.

8. 1-[2-(p-chloroanilino)ethyl]-1,3,3-trimethylurea.

9. 1-[2-(m-chloroanilino)ethyl]-1,3,3-trimethylurea.

References Cited in the file of this patent

UNITED STATES PATENTS 2,203,504    Piggott et al.            June 4, 1940

FOREIGN PATENTS 559,711    Great Britain          Mar. 2, 1944